United States Patent
Ciampini et al.

(10) Patent No.: US 10,711,168 B2
(45) Date of Patent: Jul. 14, 2020

(54) PROCESS FOR ASSEMBLING ELEMENTS CONTAINING BIOLOGICAL SUBSTANCES

(71) Applicant: SICPA HOLDING SA, Prilly (CH)

(72) Inventors: Davide Ciampini, Arnad (IT); Livio Cognolato, Arnad (IT); Luigi Vitalbo, Arnad (IT)

(73) Assignee: SICPA HOLDING SA, Prilly (CH)

( * ) Notice: Subject to any disclaimer, the term of this patent is extended or adjusted under 35 U.S.C. 154(b) by 437 days.

(21) Appl. No.: 15/410,065

(22) Filed: Jan. 19, 2017

(65) Prior Publication Data

US 2017/0130105 A1    May 11, 2017

Related U.S. Application Data

(63) Continuation of application No. 13/516,099, filed as application No. PCT/EP2009/067150 on Dec. 15, 2009, now abandoned.

(51) Int. Cl.
   *C09J 163/00*   (2006.01)
   *B01L 3/00*   (2006.01)
   (Continued)

(52) U.S. Cl.
   CPC ............... *C09J 163/00* (2013.01); *B01L 3/50* (2013.01); *C08L 33/06* (2013.01); *C09J 5/00* (2013.01);
   (Continued)

(58) Field of Classification Search
   CPC ... C09J 163/00; C09J 11/08; C09J 5/00; C09J 2483/00; C09J 2463/00; C09J 2433/00;
   (Continued)

(56) References Cited

U.S. PATENT DOCUMENTS

| 4,877,745 A | 10/1989 | Hayes et al. |
| 5,086,088 A | 2/1992 | Kitano et al. |

(Continued)

FOREIGN PATENT DOCUMENTS

| CN | 1250382 | 4/2000 |
| CN | 1585807 | 2/2005 |

(Continued)

OTHER PUBLICATIONS

Dow, Product Safety Assessment: Bisphenol A Diglycidyl Ether; Jun. 24, 2006.

(Continued)

*Primary Examiner* — Sanza L. McClendon
(74) *Attorney, Agent, or Firm* — Muncy, Geissler, Olds & Lowe, P.C.

(57) ABSTRACT

The present invention relates to a biomedical device for the distribution or containment of biological substances comprising at least two components assembled each other with an adhesive composition comprising a mixture of an acrylic adhesive composition and an epoxy adhesive composition. The present invention also relates to a method for assembling a biomedical device comprising at least two components, comprising (i) forming a film of an adhesive composition comprising a mixture of a (meth)acrylate adhesive composition and an epoxy adhesive composition on at least one surface of said at least two components, (ii) pre-curing said adhesive composition with an UV-blue radiation exposure to substantially cure said (meth)acrylate adhesive composition without substantially curing said epoxy adhesive composition, (iii) contacting said at least one surface of said at least two components to be assembled, and (iv) completing the curing of said adhesive composition with an UV-blue radiation exposure.

25 Claims, 1 Drawing Sheet

(51) Int. Cl.
*C08L 33/06* (2006.01)
*C09J 5/00* (2006.01)
*C09J 11/08* (2006.01)
*C08L 63/00* (2006.01)

(52) U.S. Cl.
CPC ....... *C09J 11/08* (2013.01); *B01L 2200/0689* (2013.01); *B01L 2200/12* (2013.01); *C08L 63/00* (2013.01); *C09J 2205/31* (2013.01); *C09J 2433/00* (2013.01); *C09J 2463/00* (2013.01); *C09J 2483/00* (2013.01)

(58) Field of Classification Search
CPC ....... C09J 2205/31; C08L 33/06; C08L 63/00; B01L 3/50; B01L 2200/12; B01L 2200/0689
USPC ....................................................... 522/170
See application file for complete search history.

(56) References Cited

U.S. PATENT DOCUMENTS

| | | | |
|---|---|---|---|
| 5,338,688 | A | 8/1994 | Deeg et al. |
| 5,932,315 | A | 8/1999 | Lum et al. |
| 5,997,517 | A | 12/1999 | Whitbourne |
| 6,176,962 | B1 | 1/2001 | Soane et al. |
| 6,306,176 | B1 | 10/2001 | Whitbourne |
| 6,830,621 | B2 | 12/2004 | Udagawa et al. |
| 6,949,297 | B2 | 9/2005 | Yang et al. |
| 7,122,093 | B1 | 10/2006 | Lee et al. |
| 7,964,248 | B2 * | 6/2011 | Fong ............... C07C 381/12 427/466 |
| 2002/0187074 | A1 | 12/2002 | O'Connor et al. |
| 2003/0192638 | A1 | 10/2003 | Yang et al. |
| 2004/0166392 | A1 | 8/2004 | Shah et al. |
| 2005/0276916 | A1 | 12/2005 | Yang et al. |
| 2008/0242058 | A1 | 10/2008 | Ichikawa et al. |
| 2011/0005427 | A1 | 1/2011 | Kim et al. |

FOREIGN PATENT DOCUMENTS

| | | |
|---|---|---|
| EP | 1933138 | 6/2008 |
| JP | 2005-345810 | 12/2005 |

OTHER PUBLICATIONS

Wikipedia: About—Wikipedia, Retrieved on May 14, 2012, http://en.Wikipedia.org/wiki/Wikipedia:About.
Yanagihara, machine translation of JP 2005345810, Dec. 15, 2005.
Office Action for Chinese Application No. 200980163363.4, which was dated Sep. 28, 2014; along with an English translation thereof.
Office Action for Chinese Patent Application No. 200980163363.4, which was dated Mar. 4, 2014, and an English translation thereof.
International Search Report of PCT/EP2009/067150 dated July 28, 2010.

\* cited by examiner

PROCESS FOR ASSEMBLING ELEMENTS CONTAINING BIOLOGICAL SUBSTANCES

The present application is a Continuation of U.S. application Ser. No. 13/516,099, which is a National Stage of International Patent Application No. PCT/EP09/67150 filed Dec. 15, 2009. The disclosure of International Patent Application No. PCT/EP09/67150 is incorporated by reference herein in its entirety.

FIELD OF THE INVENTION

The present invention relates to a process for assembling elements contacting biological substances and to a device assembled therewith.

More in particular, the present invention relates to a process for assembling elements made of plastic materials, like PMMA or SAN, or inorganic material, like glass or metals, employed for manufacturing of devices for the distribution or containment of biological substances, like proteins, enzymes, antibodies, antigens, DNA, and the like.

The present invention also relates to devices for the distribution or containment of biological substances assembled with a (meth)acrylate/epoxy adhesive composition.

BACKGROUND OF THE INVENTION

In the biomedical field, devices are known for the distribution or containment of biological substances, like proteins, enzymes, antibodies, antigens, DNA, and the like, dissolved in solutions or biological fluids.

Such biomedical devices are manufactured by assembling different components of different materials by adhesive compositions. Several patents and patent publications describe such a kind of devices.

U.S. Pat. No. 5,338,688 describes a device for ejecting biological fluids comprising a reservoir connected with an ejection chamber provided with a heating element. U.S. Pat. No. 4,877,745 describes a similar device, wherein the ejection chamber is provided with a piezoelectric element.

U.S. Pat. No. 6,830,621 describes a liquid discharge apparatus comprising (i) a liquid holding portion for holding the probe liquid, (ii) a supply opening for supplying the probe liquid to the liquid holding portion, (iii) a liquid discharging nozzle for discharging the probe liquid, and (iv) a flow path connecting the nozzle with the liquid holding portion. The nozzle openings and the supply opening are disposed on mutually opposed faces of the apparatus. The apparatus has a laminated structure composed of a first plate-shaped member in which said nozzles are formed, and a second plate-shaped member in which said plurality of liquid supply opening are formed, and intermediate plate-shaped members in which the flow path connecting the nozzle with the liquid holding portion is realized.

EP 1,933,138 discloses microarrays of capture probes on a substrate to be used in biological assays, for instance to examine analyte biological fluids, such as human blood or tissue samples, for the presence and/or concentration of certain bacteria, viruses and/or fungi. The capture probes have a selective binding capacity for a predetermined indicative factor, such as a protein, DNA or RNA sequence. In the microarray technique, a set of specific capture probes, each of which being chosen in order to interact specifically (e.g. hybridize in the case of a DNA microarray) with one particular target biological compound, are immobilized at specific locations of a biosensor solid substrate, for instance by printing. Suitable probes may comprise bio-fluids containing the specific indicative factor, for instance a solution of a specific DNA sequence and/or antibody. After the substrate has been provided with the capture probes, for instance by printing them on the substrate using an ink jet device, the analyte fluid is forced to flow through the substrate, or is forced to flow over the substrate. In order to be able to visualize the presence of an indicative factor in the analyte fluid, molecules of the analyte fluid may for instance be provided with fluorescent and/or magnetic labeling. In case of an ELISA (enzyme-linked immunosobent assay) an enzyme is attached to the second antibody, instead of a radiolabel. An intensely colored or fluorescent compound is then formed by the catalytic action of this enzyme. The labeled molecules of the analyte fluid adhere to those capture probes of the substrate that have binding capacity for the molecule considered. This results in a detectable fluorescence on the spot the specific factor adheres to, at least when using fluorescent labeling. The captured molecules are typically read by illumination with a light source, and the fluorescent pattern recorded with the aid of a CCD camera for instance. The recorded pattern is a characteristic of the presence of a bacterium or a set of bacteria. By providing capture probes with different specificity for different factors, the array may be used to assay for various different factors at the same time. Using such arrays enables high-throughput screening of analyte fluids for a large amount of factors in a single run.

U.S. Pat. No. 5,932,315 discloses a microfluidic structure assembly having a microchannel formed by bonding two plates together. The microfluidic structure assembly includes a first plate and a second plate, at least one of these plates having one or more microgrooves, joined each other by means of an adhesive composition.

The main problem of the biomedical devices obtained by assembling different components of different materials by adhesive compositions relates to the reduction of the adhesion strength under aging, in particular when different materials (like metals, silicon, plastics, or glass) are contacting each other and are exposed to mechanical and thermal stresses.

Moreover, the components of the biomedical devices described in the art, in particular in the microelectronic and microhydraulic fields, must be biocompatible with the biological substances. Accordingly, the component materials should not hold the biological substances on their surface and should not release any contaminant substance into the biological fluid.

Additionally, the component material surface should have a high wettability to allow an easy diffusion of the biological fluids, typically having an aqueous base, into the biomedical device. The wettability is even more important in devices containing microhydraulic conduits wherein the flow of the fluids depends on capillarity forces and interactions between the fluid and the contacting surface.

Surface treatments are known in the art to reduce the chemical and physical interactions between the material surfaces and the biological fluids, such as, for example, plasma treatment, corona treatment, or film coating. However, plasma and corona treatments have a limited duration over time. Film coating treatments which alter the material surface, can also make difficult the subsequent adhesion of the components and its strength under aging.

The assembling of biomedical device has another problem related to the lack of planarity of the surfaces to be assembled. The lack of planarity can be due to a bending of the component or to scratches on its surface. High amounts of conventional liquid adhesive compositions are required to cover the lack of planarity, but this easily promotes the straining of the liquid adhesive compositions into the cavities and voids of the microhydraulic channels of the biomedical devices, with the consequent occlusion thereof. The very same problem arises even using low amounts of conventional liquid adhesive compositions and hot pressure or using solid adhesive compositions dissolved in a proper solvent. In the latter case, a further problem of damages to the plastic material of the biomedical device arises, due to the attack of the solvent.

SUMMARY OF THE INVENTION

The Applicant has surprisingly found that the above mentioned problems can be overcome by assembling the components of a biomedical device for the distribution or containment of biological substances with an adhesive composition comprising a mixture of a (meth)acrylate adhesive composition and an epoxy adhesive composition.

For sake of brevity, the adhesive composition comprising a mixture of a (meth)acrylate adhesive composition and an epoxy adhesive composition will be also referred hereinbelow with the expression "(meth)acrylate/epoxy adhesive composition" or "(M)AE adhesive composition".

A first aspect of the present invention relates to a biomedical device for the distribution or containment of biological substances comprising at least two components assembled each other with an adhesive composition comprising a mixture of a (meth)acrylate adhesive composition and an epoxy adhesive composition.

Another aspect of the present invention relates to a method for assembling a biomedical device comprising at least two components, wherein said process comprises the steps of (i) forming a film of an adhesive composition comprising a mixture of a (meth)acrylate adhesive composition and an epoxy adhesive composition on at least one surface of said at least two components, (ii) pre-curing said adhesive composition with an UV-blue radiation exposure able to substantially cure said (meth)acrylate adhesive composition without substantially curing said epoxy adhesive composition, (iii) contacting said at least one surface of said at least two components to be assembled, and (iv) completing the curing of said adhesive composition with an UV-blue radiation exposure.

The expression "substantially cure" means that at least 50 mole % of the curable functional groups contained in the (meth)acrylate adhesive composition is cured. The expression "without substantially curing" means that less than 50 mole % of the curable functional groups contained in the epoxy adhesive composition is cured.

A still further aspect of the present invention relates to the use of the above mentioned (meth)acrylate/epoxy adhesive composition for assembling the components of a biomedical device for the distribution or containment of biological substances.

The (M)AE adhesive composition useful in the present invention comprises a mixture of a (meth)acrylate adhesive composition and an epoxy adhesive composition, and at least one photoinitiator.

The (meth)acrylate adhesive composition useful in the present invention can comprise any polymerizable (meth)acrylate monomer known in the art, such as for example mono-, and multi-functional (meth)acrylate monomers (including di-, tri-, tetra-functional (meth)acrylate monomers and so on).

Exemplary monofunctional (meth)acrylate monomers include, with out limitation (i) long- and short-chain alkyl (meth)acrylates such as methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, iso-amyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, octadecyl (meth)acrylate, and stearyl (meth)acrylate; (ii) hydroxyalkyl (meth)acrylates such as 2-hydroxyethyl-(meth)acrylate, 2-hydroxypropyl-(meth)acrylate and 2-hydroxybutyl-(meth)acrylate; (iii) amino alkyl (meth)acrylates such as dimethylaminoethyl (meth)acrylate, diethylamino ethyl (meth)acrylate, and 7-amino-3,7-dimethyloctyl (meth)acrylate; (iv) alkoxyalkyl (meth)acrylates such as butoxylethyl (meth)acrylate, phenoxyethyl (meth)acrylate, and ethoxyethoxyethyl (meth)acrylate; (v) single and multi-ring cyclic aromatic or non-aromatic (meth)acrylates such as cyclohexyl (meth)acrylate, benzyl (meth)acrylate, dicyclopentadiene (meth)acrylate, dicyclopentyl (meth)acrylate, tricyclodecanyl (meth)acrylate, bornyl (meth)acrylate, isobornyl (meth)acrylate, tetrahydrofurfuryl (meth)acrylate, caprolactone (meth)acrylate, and acryloylmorpholine; (vi) glycol (meth)acrylates such as polyethylene glycol monoacrylate, polyethylene glycol mono-methacrylate, polypropylene glycol monoacrylate, polypropylene glycol monomethacrylate, polyethylene glycol-polypropylene glycol mono-methacrylate, methoxyethylene glycol acrylate, methoxypolypropylene glycol acrylate, methoxypolyethylene glycol acrylate, methoxypolyethylene glycol monomethacrylate, ethoxydiethylene glycol acrylate, polypropylene glycol-polytrimethylene monoacrylate, polyethylene glycol-polytetramethylene glycol monomethacrylate, perfluoroalkylethyl-polyoxyalkylene monomethacrylate, and (vii) various alkoxylated alkylphenol (meth)acrylates such as ethoxylated nonylphenol (meth)acrylate, and combinations thereof.

Exemplary multifunctional (meth)acrylate monomers include, without limitation (i) di(meth)acrylates, such as 1,3-propanediol di(meth)acrylate, 1,4-butanediol di(meth)acrylate, 1,5-pentanediol di(meth)acrylate, 1,6-hexanediol di(meth)acrylate, neopentyl glycol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, cyclohexane dimethanol di(meth)acrylate, alkoxylated hexanediol di(meth)acrylate, alkoxylated cyclohexane dimethanol di(meth)acrylate, ethoxylated neopentyl glycol di(meth)acrylate, propoxylated neopentyl glycol di(meth)acrylate, trimethylolpropane tri(meth)acrylate, ethoxylated trimethylolpropane tri(meth)acrylate, propoxylated trimethylolpropane tri(meth)acrylate, (meth)acrylated polyester oligomer, bisphenol A di(meth)acrylate, ethoxylated bisphenol A di(meth)acrylate, bisphenol A diglycidyl ether di(meth)acrylate, resorcinol diglycidyl ether di(meth)acrylate, ethoxylated cyclohexanedimethanol di(meth)acrylate, propoxylated cyclohexanedimethanol di(meth)acrylate, (ii) triacrylates, such as ditrimethylolpropane triacrylate (DiTMPTTA), tris-(2-hydroxyethyl)-isocyanurate triacrylate (THEICTA), dipentaerythritol triacrylate (DiPETA), ethoxylated trimethylolpropane triacrylate (TMPEOTA), propoxylated trimethylolpropane triacrylate (TMPPOTA), ethoxylated pentaerythritol triacrylate (PETEOIA), propoxylated glyceryl triacrylate (GPTA), pentaerythritol triacrylate (PETA), trimethylolpropane triacrylate (TMPTA) and modified pentaerythritol triacrylate; and trimethacrylates, such as triethyleneglycol trimethacrylate (TIEGTMA), tetraethyleneglycol trimethacrylate (TTEGTMA), polyethyleneglycol trimethacrylate (PEGTMA), trihydroxyhexane trimethacrylate (HTTMA), ethoxylated bisphenol A trimethacrylate, trimethylolpropane trimethacrylate (TMPTMA), ethoxylated trimethylolpropane trimethacrylate (TMPETMA), commercially available, for example, from IGM Resins, under the tradename Omnimer®, and (iii) tetra(meth)acrylates such as pentaerythritol tetra(meth)acrylate, ethoxylated pentaerythritol tetra(meth)acrylate, propoxylated pentaerythritol tetra(meth)acrylate, dipentaerythritol tetra(meth)acrylate, ethoxylated dipentaerythritol tetra(meth)acrylate, propoxylated dipentaerythritol tetra(meth)acrylate, aryl urethane tetra(meth)acrylates, aliphatic urethane tetra(meth)acrylates, melamine tetra(meth)acrylates, epoxy novolac tetra(meth)acrylates, polyester tetra(meth)acrylates, and mixtures thereof.

The (M)AE adhesive composition useful in the present invention can comprise from about 5% to about 45% by weight, based upon the total weight of the composition, of the (meth)acrylate adhesive composition. According to a preferred embodiment, the (M)AE adhesive composition comprises from about 10% to about 30% by weight, based upon the total weight of the composition, of the (meth) acrylate adhesive composition.

Preferably, the adhesive composition useful in the present invention comprises polymerizable acrylate monomers selected from the above described mono-, and multi-functional acrylate monomers.

The epoxy adhesive composition useful in the present invention can comprise any polymerizable epoxy resin known in the art, such as for example condensation reaction products of epichlorohydrin and a polyhydric alcohol or polyhydric phenol (particularly bisphenol A), cycloalkyl oxide epoxy resins, epoxy resins derived from diolefin or polyolefin or a copolymer thereof, epoxy resins prepared by copolymerization of glycidyl methacrylate and a vinyl compound, epoxy resins prepared from a glyceride of a high unsaturated fatty acid, and the like.

An illustrative, but by no means exhaustive, listing of suitable dihydric phenols includes 4,4'-isopropylidene bisphenol, 2,4'-dihydroxydiphenylethyl methane, 3,3'-dihydroxydiphenyldiethyl methane, 3,4'-dihydroxydiphenylmethylpropyl methane, 2,3'-dihydroxydiphenylethylphenyl methane, 4,4'-dihydroxydiphenyl-propyl phenyl methane, 4,4'-dihydroxydiphenylbutyl phenyl methane, 2,2'-dihydroxydiphenylditolyl methane, 4,4'-dihydroxydiphenyltolylmethyl methane and the like. Other polyhydric phenols which may also be coreacted with an epihalohydrin to provide these epoxy polyethers are such compounds as resorcinol, hydroquinone, substituted hydroquinones, e.g., methylhydroquinone, and the like.

Among the polyhydric alcohols which can be coreacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like Exemplary polymerizable epoxy resins include, without limitation (i) cycloalkyl epoxy resins, such as 2,4-epoxycyclohexylmethyl-(3,4-epoxy)cyclohexane carboxylate (sold under the trademarks ERL 4221 by Union Carbide Plastics Company or Araldite CY 179 by Ciba Products Company), 3,4-epoxycyclohexylmethyl-(3,4-epoxy)cyclohexane carboxylate (sold under the trademarks Celvenus B1077 by Daicel Chemical Industries), bis(3,4-epoxy-6-methylcyclohexylmethyl) adipate (sold under the trademarks ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl) ether resins (sold under the trademark ERL 4205 by Union Carbide Plastics Company), 2-(3,4-epoxy)cyclohexyl-5,5-spiro(3,4-epoxy)-cyclohexane-m-dioxane (sold under the trademark Araldite CY 175 by Ciba Products Company); (ii) glycidyl ethers of polyphenol epoxy resins, such as liquid bisphenol A diglycidyl ether epoxy resins (such as those sold under trademarks as Epon 826, Epon 828, Epon 830, Epon 1001, Epon 1002, Epon 1004, etc. by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company) tetraglycidoxy tetraphenylethane (Epon 1031 made by Shell Chemical Company); (iii) glycidyl ester epoxy resins such as diglycidyl phthalate (ED-5661 by Celanese Resins Company), diglycidyl tetrahydrophthalate (Araldite CY 182 by Ciba Products Company) and diglycidyl hexahydrophthalate (Araldite CY 183 made by Ciba Products Company or ED-5662 made by Celanese Resins Company); and mixture thereof.

The (M)AE adhesive composition useful in the present invention can comprise from about 30% to about 80% by weight, based upon the total weight of the composition, of the epoxy adhesive composition. According to a preferred embodiment, the (M)AE adhesive composition comprises from about 40% to about 70% by weight, based upon the total weight of the composition, of the epoxy adhesive composition.

The Applicant has found that when the above mentioned (meth)acrylate/epoxy adhesive composition is used, the cured composition exhibits excellent antifouling and adhesion properties.

Moreover, the surface of the materials covered with the cured (M)AE adhesive composition which remain exposed, i.e., not joined to the surface of another material, resulted to be biocompatible with the biological fluids. In other words, the surface of the materials covered with the cured (M)AE adhesive composition neither links external components contained in the biological fluids contacting it, nor releases internal components which could alter the composition of the biological fluids contacting it.

Accordingly, the use of the (meth)acrylate/epoxy adhesive composition allows to avoid all those surface treatments, like thermal treatment, corona treatment, plasma treatment, and so on, which conventionally are employed to improve the biocompatibility and antifouling properties.

Further, the Applicant has also found that when the above mentioned (meth)acrylate/epoxy adhesive composition is used in the process of the present invention it is possible to overcome all the problems related to the lack of planarity of the biomedical device surfaces to be assembled. In particular, the Applicant has found the (meth)acrylate/epoxy adhesive composition can be coated uniformly on the surface to be assembled, without any straining into the microhydraulic channels of the biomedical devices and any damages to the plastic material of the biomedical device.

Another aspect of the present invention relates to a method for assembling a biomedical device comprising at least two components, wherein said process comprises the steps of (i) forming a film of an adhesive composition comprising a mixture of a (meth)acrylate adhesive composition and an epoxy adhesive composition on at least one surface of said at least two components, (ii) pre-curing said adhesive composition with an UV-blue radiation exposure able to substantially cure said (meth)acrylate adhesive composition without substantially curing said epoxy adhesive composition, (iii) contacting said at least one surface of said at least two components to be assembled, and (iv) completing the curing of said adhesive composition with an UV-blue radiation exposure.

As mentioned above, the process of the present invention comprises a film forming step (i), a pre-curing step (ii), a contacting step (iii), and a final curing step (iv). The polymerization of the (meth)acrylate/epoxy adhesive composition starts in the pre-curing step (i) and proceeds through contacting step (iii), and the final curing step (iv).

In the pre-curing step (ii), the (M)AE adhesive composition is irradiated with an UV-blue radiation sufficient to start and substantially complete the curing of the (meth)acrylate portion of the (M)AE adhesive composition, and sufficient to start but not to substantially complete the curing of the epoxy portion of the (M)AE adhesive composition.

In the contacting step (iii), the (M)AE adhesive composition is preferably heated to substantially complete the curing of the epoxy portion of the (M)AE adhesive composition.

In the curing step (iv), the (M)AE adhesive composition is irradiated with an UV-blue radiation able to complete the curing of the whole (M)AE adhesive composition.

Accordingly, in the process of the present invention it is important to choose an exposing condition and a mixture of a (meth)acrylate adhesive composition and an epoxy adhesive composition wherein the conversion percentage and the curing speed of the two compositions are substantially different.

Advantageously, the pre-curing step (ii) is performed under nitrogen atmosphere and at room temperature by irradiating a coated layer of (M)AE adhesive composition having a thickness of about 20 μm with an UV-blue radiation providing an energy higher than 20 mJ/cm$^2$, more preferably higher 30 mJ/cm$^2$, and lower than 80 mJ/cm$^2$, more preferably lower than 70 mJ/cm$^2$. A person skilled in the art would easily understand how to adjust the above mentioned irradiating conditions when using a layer of (M)AE adhesive composition having a different thickness.

Under these conditions, in the pre-curing step more than 50 mole % of the curable functional groups contained in the (meth)acrylate adhesive composition is cured, preferably more than 70 mole %, and more preferably more than 80 mole %, while less that 50 mole % of the curable functional groups contained in the epoxy adhesive composition is cured, preferably less than 40 mole %, and more preferably less than 30 mole %.

After irradiation under the above conditions, the curing of at least 90 mole % of the curable functional groups contained in the (meth)acrylate adhesive composition is reached in a few minutes at room temperature, such as for example from 1 to 10 minutes, preferably from 1 to 5 minutes, while the completion of the curing of the curable functional groups contained in the epoxy adhesive composition cannot be reached at room temperature (the Applicant observed a maximum curing of the curable functional groups contained in the epoxy adhesive composition of about 60 mole % only after five hours). The curing of at least 90 mole % of the curable functional groups contained in the epoxy adhesive composition is reached during the contacting step (iii) and the final curing step (iv), wherein (M)AE adhesive composition is subjected to a further exposure to an UV-blue radiation of higher energy and/or to a heating to a temperature higher than 50° C., preferably higher than 70° C.

Advantageously, the polymerization of the (meth)acrylate adhesive composition is carried out by free-radical photopolimerization by using a radical photoinitiator sensitive to UV-blue radiation, and the polymerization of the epoxy adhesive composition is carried out by cationic photopolimerization by using a cationic photoinitiator sensitive to UV-blue radiation. As used herein, "photoinitiator" means a suitable compound which is capable of converting the UV and/or blue radiation energy into free radicals.

Examples of suitable radical photoinitiators include but are not limited to: 2,2'-(2,5-thiophenediyl)bis(5-tert-butybenzoxazole); 1-hydroxycyclohexyl phenyl ketone; 2,2-dimethoxy-2-phenylacetophenone; xanthone; fluorenone; anthra-quinone; 3-methylacetophenone; 4-chlorobenzophenone; 4,4'-dimethoxy-benzophenone; 4,4'-diaminobenzophenone; Michler's ketone; benzophenone; benzoin propyl ether; benzoin ethyl ether; benzyl dimethyl ketal, 1-(4-isopropylphenyl)-2hydroxy-2-methylpropane-1-one; 2-hydroxy-2-methyl-1phenyl-propane-1-one; methylbenzoyl formate thioxanthone; diethylthioxanthone; 2-isopropylthioxanthone; 2-chlorothioxanthone; 2-methyl-1-(4-(methylthio)phenyl)-2-morpholinopropane-1-one; and 2,4,6-trimethylbenzoyidiphenylphosphine oxide.

Preferably, multifunctional radical photoinitiators are utilized in the adhesive composition. The use of multifunctional photoinitiators further reduces the possibility of photoinitiator or fragments of the photoinitiator from migrating. Examples of suitable multifunctional photoinitiators include, but are not limited to, the Esacure KIP 100 (a mixture of 70% of an oligomeric α-hydroxy acetophenone and 30% of dimethyl hydroxy acetophenone), KIP 150, Esacure KTO-46 (blend of trimethylbenzophenone, polymeric hydroxy ketone, and trimethylbenzoyldiphenyl phosphine oxide), and Esacure ONE (difunctional alpha-hydroxyketone photoinitiator), all commercially available from Lamberti S.p.A., Gallarate, Italy).

Examples of suitable cationic photoinitiators include but are not limited to: triarylsulfonium salts or diaryliodonium salts having non-nucleophilic anions such as hexafluorophosphate (also known as Cyracure UVI-6990), hexafluoroantimonate (also known as UVI-6974), tetrafluoroborate, and hexafluoroarsenate. Particularly preferred cationic photoinitiators is the triarylsulfonium hexafluoroantimonate, commercially available from Aldrich under the tradename LFC2178.

Each of the radical photoinitator and cationic photoinitator is usually added to the (M)AE adhesive composition in amounts from about 0.1 to 5 wt. %, based on the total weight of the (M)AE adhesive composition. A mixture of different radical and cationic photoinitiators can also be used.

Advantageously, the (M)AE adhesive composition preferably comprises from about 1% to about 20% by weight of oxetane, based upon the total weight of the composition. In a preferred embodiment, the (M)AE adhesive composition includes from about 5% to about 15% by weight of oxetane. The oxetane is useful to reduce the viscosity of the (M)AE adhesive composition without employing any conventional organic solvent (like acetone, ethanol, and the like). At the same time, the oxetane is able to copolymerize with the epoxy portion of the (M)AE adhesive composition.

Particularly, the (M)AE adhesive composition preferably comprises from about 0.01% to about 2% by weight of a flow agent, based upon the total weight of the composition. In a preferred embodiment, the composition includes from about 0.02% to about 1% by weight of a flow agent. As used herein, "flow agent" means a suitable surface wetting or leveling agent. Preferably, the flow agent is a siloxane. More preferably, the siloxane is polyester modified dimethyl polysiloxane. A suitable commercially available product is Byk 310° (Byk Chemie; Wallingford, Conn.). Most preferably, the (M)AE adhesive composition includes about 0.1% of Byk 310®.

The (M)AE adhesive composition preferably comprises from about 1% to about 20%, preferably from about 2% to about 15% by weight, based upon the total weight of the (M)AE composition, of at least one coupling agent. The coupling agent can especially be a compound chosen from the silane compounds, such as, for example, aminosilanes, and unsaturated silanes such as a vinylsilane or a methacrylsilane.

Examples of suitable silane compounds include, but are not limited to, the commercially available vinyltria3-methoxyethoxy)silane (A172) or γ-methacryloxypropyltrimethoxysilane (A174), both marketed by Union Carbide.

The Applicant has found that the addition of the above mentioned silane compounds can improve the adhesion between glass and other surfaces, like silicon and plastic materials, like polymethylmethacrylate (PMMA) and styrene acrylonitrile (SAN).

The (M)AE adhesive composition preferably comprises from about 1% to about 20%, preferably from about 5% to about 10% by weight, based upon the total weight of the composition, of at least one oxygen scavenger.

The oxygen scavenger can especially be a compound chosen from substituted phenols, such as, for example, butylated hydroxy toluene (BHT) and mono-t-butyl hydroquinone (MTBHQ) and tertiary and/or aromatic amines, such as, for example, alkylated diphenyl amines and naphthylamines. BHT is commercially available from the Uniroyal Chemical Company, while MTBHQ is commercially available from the Eastman Chemical Company. Alkylated diphenyl amines are commercially available from Monsanto, under the Flectol tradename series. Naphthylamines are commercially available from Mobay, under the Vukanox tradename series.

When the (M)AE adhesive composition comprises an oxygen scavenger, the pre-curing and curing steps can be also performed in the presence of oxygen. This is particularly advantageous when the biomedical device comprises areas or zones, like chambers isolated from a valve system, difficultly reached by a nitrogen flow. In such a case, when using aromatic amines, the thermal and/or UV-exposure energy required for the completion of the curing of the epoxy adhesive composition should be increased The (M)AE adhesive composition can be advantageously employed for assembling the components of a biomedical device for the distribution or containment of biological substances. As described above, the components of the biomedical device to be joined can be made of different materials, such as inorganic materials, like, for example, silicon, glass, aluminum and other metals conventionally employed, or plastic materials, like, for example, polymethylmethacrylate (PMMA), cyclic olefin copolymers (COC), polycarbonates (PC), styrene acrylonitrile copolymers (SAN), and the like. The (M)AE adhesive composition has been proven to be able to join the components made of the same or different material.

Biomedical devices for the distribution or containment of biological substances are known in the art. Biomedical devices of the present invention are for example microarray biochip (described below and illustrated in FIGS. 1 and 2) and thermal or piezoelectric ejection heads (described below, but not illustrated in the figures).

As indicated above, a feature of a biomedical device for the distribution of biological substances is the provision of a thermal or piezoelectric ejection head to deposit a quantity of the biological fluid onto a substrate surface. Thermal and piezoelectric ejection heads are well known in the art of conventional printing and document production.

As is known to those of skill in the art, thermal and piezoelectric ejection heads typically have at least the following components: (a) an orifice; (b) an ejection chamber; and (c) an actuating element, which can be a heating or piezoelectric element. Ejection heads are typically formed on a silicon substrate comprising the electronic components to operate the actuating element.

The size of the orifice is sufficient to produce a spot of suitable dimensions on the substrate surface, where the orifice generally has a diameter ranging from about 1 to 1000 μm, usually from about 5 to 100 μm and more usually from about 10 to 60 μm.

The ejection chamber has a volume ranging from about 1 pl to 10 nl, usually from about 10 pl to 5 nl and more usually from about 35 pl to 1.5 nl.

The actuating element is realized to deliver a quick energy pulse, either in the thermal or pressure form. The heating element is capable of achieving temperatures sufficient to vaporize a sufficient volume of the biological fluid in the ejection chamber to produce a drop of a predetermined volume of biological fluid from the orifice. Generally, the heating element is capable of attaining temperatures of at least about 100° C., usually at least about 400° C., and more usually at least about 700° C., where the temperature achievable by the heating element may be as high as 1000° C. or higher. The piezoelectric element is capable to change its dimension and to reduce the volume of the ejection chamber under the action of an electrical pulse to produce a pressure able to eject a drop of a predetermined volume of biological fluid from the orifice.

A barrier layer defining the microhydraulic of the biomedical device is usually laminated on the silicon substrate. Alternatively, the barrier layer may also be preformed and then assembled on the silicon substrate. The barrier layer is usually made with a photopolymer compound and define the supply chamber(s) and the microchannels supplying the biological fluid to the ejection chamber. Representative photopolymer compounds suitable for fabricating the barrier layer include but are not limited to: (1) epoxy polymers; (2) acrylic and melamine copolymers, (3) epoxy-acrylate copolymers, and (4) polyimides, although materials generally classified as photoresists or solder-masks can be used for this purpose.

At least one additional layer is then assembled on the barrier layer. The additional layer(s) define(s) supply channels having a size progressively increasing from the lowermost layer to the uppermost layer. The last additional layer is provided with supply openings for supplying the biological fluid connected to reservoir chambers for containing the biological fluid. In turn, the reservoir chambers are connected to the supply chamber(s) of the barrier layer through the above mentioned supply channels. The diameter of the supply channels starts from a 300 µm up to 1000 µm, and the diameter or diagonal (depending of its shape) of the reservoir chambers can be up to 2 mm. The additional layer(s) may be made of plastic material, such as, for example, polymethylmethacrylate (PMMA) or styrene acrylonitrile (SAN), glass, or a combination thereof.

Finally, a cover layer can be optionally assembled on the uppermost layer to seal the biomedical device after the biological fluid has been supplied to substantially fill the above mentioned reservoir chambers, supply channels and supply chambers.

In turn, a feature of a biomedical device for the containment of biological substances is the provision of a discrete microarray of capture probes immobilized at specific locations of a solid substrate to be used in biological assays, for instance to examine analyte biological fluids, such as human blood or tissue samples, for the presence and/or concentration of certain bacteria, viruses and/or fungi. Such a biomedical device is commonly known as microarray biochip, or simply biochip. In particular, a biomedical device for the containment of biological substances can be constituted by (i) a transparent solid substrate on which a discrete microarray of capture probes has been deposited (ii) a containing chamber realized by photolithographic technique in a polymeric layer to confine biological samples (serum, blood, cells, oligomers and so on) and reagents in correspondence with such a microarray, (iii) a cover with input and output channels through which the biological samples are introduced and washed away.

The assembling of the several components of the above described biomedical devices is advantageously made by process of the present invention, which comprises the steps of (i) forming a film of an adhesive composition comprising a mixture of a (meth)acrylate adhesive composition and an epoxy adhesive composition on at least one surface of said at least two components, (ii) pre-curing said adhesive composition with an UV radiation exposure able to substantially cure said (meth)acrylate adhesive composition without substantially curing said epoxy adhesive composition, (iii) contacting said at least one surface of said at least two components to be assembled, and (iv) completing the curing of said adhesive composition with an UV radiation exposure.

The film forming step (i) can be advantageously performed by spray coating techniques. The spraying coating apparatus typically requires to employ liquid having a viscosity lower than 100 cPoise. Liquids having a viscosity higher than 100 cPoise can also be used, but they require dedicated and expensive spraying coating apparatus, such as, for example, EFD (Engineered Fluid Dispensing) apparatus. The (meth)acrylate/epoxy adhesive composition useful in the present invention advantageously has a viscosity lower than 100 cPoise, preferably lower than 80 cPoise. Accordingly, the (meth)acrylate/epoxy adhesive composition has a viscosity compatible with the requirements of spraying coating apparatus. This allows to avoid the use of organic solvents, which could potentially damage the plastic materials, and then allows to realize biomedical device with plastic materials.

Accordingly, the above mentioned film forming step (i) is advantageously performed in the substantial absence of any solvent, i.e., it is solvent-free. The use of the adhesive composition allows to obtain a coated film having a constant and homogeneous thickness. The thickness of the coated film of the (meth)acrylate/epoxy adhesive composition is not particularly limited, and depends on the kind of apparatus employed to coat it and to the desired application. The thickness can range from about 1 µm (the lower limit being often dependent from the spraying apparatus specifications) to about 500 µm, and even more. However, the thickness of the coated film of (M)AE adhesive composition preferably ranges from about 5 µm to about 100 µnn.

The Applicant has found that the surface of the materials treated with the (M)AE adhesive composition which remain exposed, i.e., not joined to the surface of another material shows several improved characteristics.

First, the material surface has improved wettability, so allowing an easy diffusion of the biological fluids, typically having an aqueous base, into the biomedical device. The wettability is even more important in devices containing microhydraulic conduits wherein the flow of the fluids depends on capillarity forces and interactions between the fluid and the contacting surface. The wettability of the material surface covered with the cured (M)AE adhesive composition described herein, when measured with the contact angle method by using a drop of water contacting the adhesive composition layer, is equal to or lower than 50°, preferably lower than 40°, and more preferably lower than 35°.

Second, the material surface has improved biocompatibility and exhibits excellent antifouling and protective properties. In other words, the surface of the materials covered with the cured (M)AE adhesive composition described herein neither links external components contained in the biological fluids contacting it, nor releases internal components which could alter the composition of the biological fluids contacting it.

Preferably, the surface of the components to be joined is previously subjected to a plasma treatment. Plasma treatment is a widely known processing technology that aims at modifying the chemical and physical properties of a surface by using a plasma-based material. Plasma treatment includes plasma activation, plasma modification, plasma functionalization and plasma polymerization. Plasma processing is widely used in the field of electronics, automotive, textile, medical and aeronautic.

A general review about plasma technology can be found on the Europlasma internet site at http://www.europlasma.be/pageview.aspx.

The plasma treatment is performed by flowing a plasma gas on the surface of the components in an apparatus comprising a plasma chamber powered with a couple of electrodes. Any conventional plasma gas can be used, provided that it is free from oxygen, either in atomic and molecular form. The Applicant has observed that the presence of oxygen reduces the adhesion strength because the oxygen adsorbed on the surface inhibits the curing of the adhesive composition. The plasma gas is preferably selected from the group consisting of saturated and unsaturated hydrocarbons, nitrogen-containing hydrocarbons, nitrogen, ammonia, hydrogen, and mixture thereof. Saturated hydrocarbons, such as, for example, methane and ethane, and forming gas, a mixture of nitrogen and hydrogen with a 10%, preferably 5%, maximum content of hydrogen, are preferably used in the process of the present invention. More preferably, the forming gas useful in the process of the present invention comprises a mixture of 95% of nitrogen and 5% of hydrogen. Preferably, the mixture of methane and forming gas has a methane to forming gas weight ratio of from 1:5 to 5:1, more preferably from 1:3 to 3:1 and most preferably from 1:2 to 2:1.

The plasma apparatus typically includes a chamber containing positive and ground electrodes attached to a radio frequency (RF) generator. The chamber comprises a support which is positioned between the positive and ground electrodes. The support is properly isolated from the chamber walls. The components to be treated are preferably put on the support between the positive and ground electrodes. Alternatively, the components can also be put in contact with the positive electrode or the ground electrode. In operation, a vacuum is created within the chamber until a pre-selected pressure in the range of from 1 to 30 milliTorr, preferably from 5 to 20 milliTorr is reached.

The gas is usually introduced into the chamber for a time of from 15 seconds to 3 minutes until to achieve the desired flow rate and partial pressures. The flow rate is preferably comprised from 1 to 300 sccm, more preferably form 10 to 200 sccm, and most preferably from 50 to 150 sccm (sccm=Standard Cubic Centimeters per Minute). The partial pressures is preferably comprised from 10 to 500 milliTorr, more preferably from 30 to 300 milliTorr, and most preferably from 50 to 250 milliTorr. Once the flow rate and pressure in the chamber are stabilized, a high voltage is applied in the radio frequency range of the apparatus between the ground and the positive electrodes and is maintained for the required time. The radio frequency power is preferably in the range of from 10 to 1000 Watt, more preferably from 30 to 700 Watt, and most preferably from 50 to 400 Watt. Preferably, the plasma treatment is conducted for a period of time in the range of from 10 seconds to 60 minutes, more preferably from 20 seconds to 30 minutes, and most preferably from 30 seconds to 10 minutes.

The plasma treatment can be conducted under constant conditions, i.e., without modifying the above described values of gas flow rate, gas mixture, pressure, and power, or under variable conditions.

Preferably, the pre-curing step (ii) can be performed by exposure to radiation having a wavelength in the UV-blue range, namely from 200 to 500 nanometers. The energy of the UV-blue radiation is absorbed by a photoinitiator, which is capable of converting the light energy into free radicals.

The pre-curing step is preferably performed with an UV radiation exposure having a wavelength from 200 to 400 nanometers and a radiation energy able to substantially cure said (meth)acrylate adhesive composition without substantially curing said epoxy adhesive composition. As previously mentioned, the expression "substantially cure" means that at least 50 mole % of the curable functional groups contained in the (meth)acrylate adhesive composition is cured, and the expression "without substantially curing" means that less then 50 mole % of the curable functional groups contained in the epoxy adhesive composition is cured.

Advantageously, in the pre-curing step more than 50 mole %, preferably more than 70 mole %, and more preferably more than 80 mole % of the curable functional groups contained in the (meth)acrylate adhesive composition is completely cured, while less that 50 mole %, preferably less than 40 mole %, and more preferably less than 30 mole % of the curable functional groups contained in the epoxy adhesive composition is completely cured.

Preferably, in the pre-curing step from about 85 to 95 mole % of the curable functional groups contained in the (meth)acrylate adhesive composition is completely cured, while from 5 to 25 mole % of the curable functional groups contained in the epoxy adhesive composition is completely cured.

Advantageously, the radiation energy is higher than 20 mJ/cm$^2$, more preferably higher 30 mJ/cm$^2$, and lower than 80 mJ/cm$^2$, more preferably lower than 70 mJ/cm$^2$.

Advantageously, the contacting step (iii) is performed by thermocompression, by using apparatus provided with centering means able to line up the components to be joined. The contacting step can be performed at a temperature ranging from 50° to 250° C., preferably from 60° to 150° C. depending on the employed materials. Preferably, the components are pressed each other with a pressure ranging from 1 to 10 bar, preferably from 2 to 7 bar. Preferably, the contacting step (iii) is followed by the removal of the air possibly trapped between two surfaces. The air removal is preferably performed by subjecting the contacted surface to a reduced pressure, such as, for example, 50 mmHg or even less. Further, the excess of adhesive can also been removed from channels and/or recesses of the components by subjecting the components to the action of vacuum apparatus.

During the contacting step, the heating of the thermocompression process advantageously raises the temperature of the (M)AE adhesive composition over 50° C., preferably higher than 70° C. As mentioned above, such temperatures promote the curing of at least 90 mole % of the curable functional groups contained in the epoxy adhesive composition.

Generally, the curing step (iv) is again performed by exposure to radiation having a wavelength in the UV-blue range, namely from 200 to 500 nanometers.

The curing step is preferably performed with an UV radiation exposure having a wavelength from 200 to 400 nanometers and a radiation energy able to complete the curing of both the (meth)acrylate and epoxy portions of the (M)AE adhesive compositions.

Advantageously, the radiation energy of the UV-blue radiation of the curing step (iv) is higher than 500 mJ/cm$^2$, more preferably higher 1000 mJ/cm$^2$, and lower than 3000 mJ/cm$^2$, more preferably lower than 2000 mJ/cm$^2$.

Both the pre-curing step (ii) and the curing step (iv) are preferably performed under an oxygen-free atmosphere, typically under a nitrogen atmosphere, to avoid the above mentioned inhibiting effect that oxygen has on the polymerization. Anyway, the (M)AE adhesive composition can comprise an oxygen scavenger, like for example, tertiary and/or aromatic amines. In such a case, the pre-curing and curing steps can be also performed in the presence of oxygen. This is particularly advantageous when the biomedical device comprises areas or zones, like chambers isolated from a valve system, difficultly reached by a nitrogen flow.

The amount of biological fluid required to fill the biomedical device is typically small, generally not exceeding more than about 10 usually not exceeding more than about 5 μl and in many embodiments not exceeding more than about 2 μl. As such, the amount of biological fluid that is wasted during filling is minimal. As such, fluid loading is highly efficient. Therefore, the biomedical device of the present invention is particularly suited for use with rare and/or expensive biological fluid samples.

Biological fluid samples include solution or suspension of biological molecular compounds such as, but not limited to, nucleic acids and related compounds (e.g. DNAs, RNAs, oligonucleotides or analogs thereof, PCR products, genomic DNA, bacterial artificial chromosomes, plasmids and the like), proteins and related compounds (e.g. polypeptides, monoclonal antibodies, receptors, transcription factors, and the like), antigens, ligands, haptens, carbohydrates and related compounds (e.g. polysaccharides, oligosaccharides and the like), cellular organelles, intact cells, biopolymers and the like.

The filled and optionally sealed biomedical distribution device can be used to deposit an extremely small quantity of the biological fluid on a proper support, where the support may be a planar structure, e.g., a slide, a reagent container, e.g., a well in a multiwell plate (such as the bottom of a well), a channel or micro structure, an array, and so on.

The biomedical distribution device of the present invention can be used to deposit a pico liter quantity of fluid onto an array surface. By "pico liter quantity" is meant a volume of fluid that is at least about 0.1 pl, usually at least about 1 pl and more usually at least about 10 pl, where the volume may be as high as 250 pl or higher, but generally does not exceed about 100 nL and usually does not exceed about 1 µl.

In turn, biomedical containment device of the present invention can be used with extremely small quantity of the biological sample fluid (like blood, urine, intestinal fluids or saliva), with improved cleaning and sterile conditions, and ease of use. Typically, the biomedical containment device of the present invention can contain from 10 µl to 500 µl of biological sample fluid depending on the volume of the containing chamber, which in turn depends on the chamber shape and thickness.

The use of the (meth)acrylate/epoxy adhesive composition presented several advantages.

As mentioned above, the cured composition exhibits excellent antifouling and adhesion properties.

Additionally, the surface of the materials covered by the cured (meth)acrylate/epoxy adhesive composition which remains exposed, such as, for example, the surface of supply chamber(s), microchannels, supply channels, and reservoir chambers, resulted to be biocompatible with the biological fluids. In other words, the surface of the materials covered with the cured (meth)acrylate/epoxy adhesive composition neither links external components contained in the biological fluids contacting it, nor releases internal components which could alter the composition of the biological fluids contacting it.

Accordingly, the use of the (meth)acrylate/epoxy adhesive composition allows to avoid or limit all those surface treatments, like thermal treatment, corona treatment, plasma treatment, and so on, which conventionally are employed to improve the biocompatibility and antifouling properties.

Moreover, the use of the (meth)acrylate/epoxy adhesive composition in combination with the process of the present invention allows to solve the above mentioned problems related to the lack of planarity of the surfaces to be assembled.

In fact, the (meth)acrylate/epoxy adhesive composition employed in the film forming step (i) has the proper viscosity and wettability for providing a continuous film on the surfaces to be assembled, so leveling any defect or scratch of such surfaces, and the pre-curing step (ii) allows to increase the viscosity of the liquid composition to avoid straining of the liquid adhesive compositions into the cavities and voids of the microhydraulic channels of the biomedical devices during the subsequent contacting step (iii).

BRIEF DESCRIPTION OF THE DRAWINGS

Further features and advantages will become more apparent from the detailed description of a preferred, but not exclusive, embodiment of a biological device assembled with the process of the present invention. This description will be set out hereinafter with reference to the accompanying drawings, given by way of non-limiting example, in which.

DETAILED DESCRIPTION OF THE INVENTION

The following will describe, with reference to the figures, a preferred embodiment of the invention.

Figure 1:
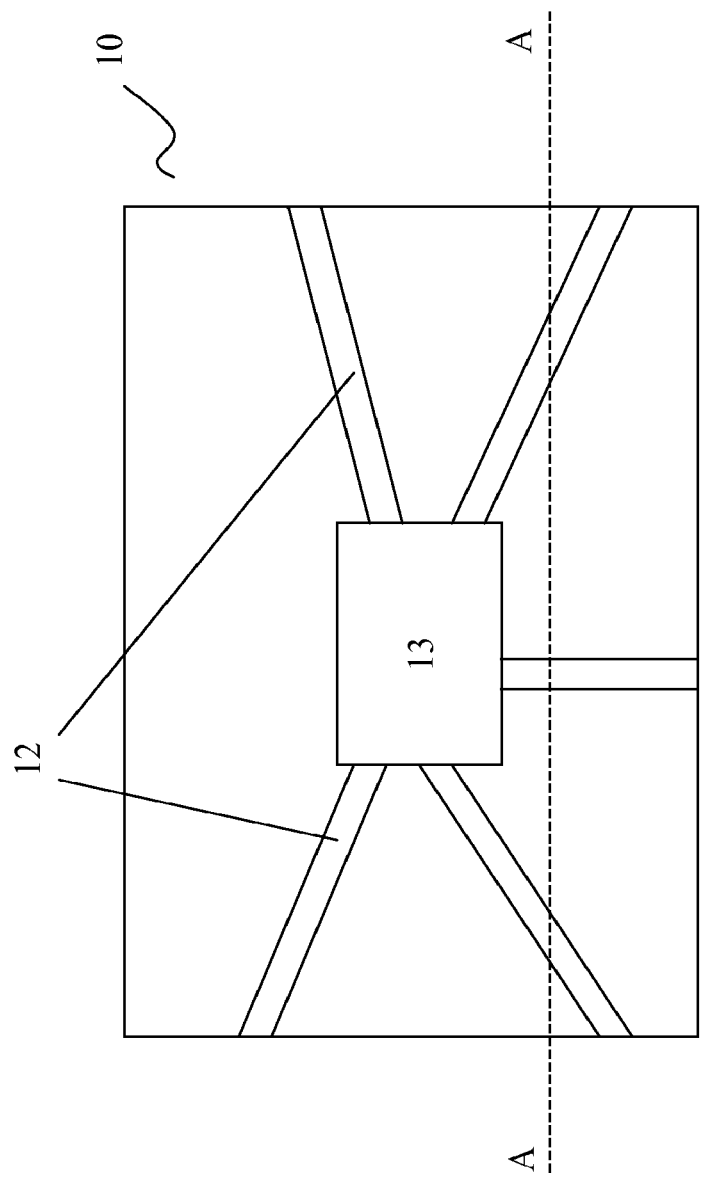
FIG. 1 is a schematic top view of an embodiment of the biochip of the present invention.
Figure 2:
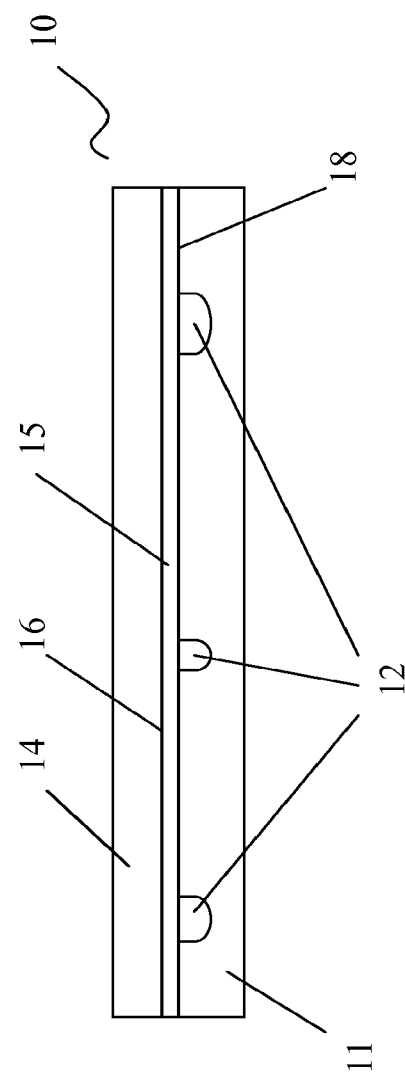
FIG. 2 is a schematic A-A cross sectional view of the biochip of FIG. 1.

FIGS. 1 and 2 show different views of an embodiment of a biochip 10 according to the present invention.

The biochip 10 comprises a transparent PMMA substrate 11 on which a suitable pattern of microchannels 12 and chamber 13 to introduce, confine, and extract biological samples (serum, blood, cells, oligomers and so on) and reagents has been realized.

A PMMA cover 14 closes the biochip 10. A thin layer of cured (meth)acrylate/epoxy adhesive composition 15 is interposed between the transparent substrate 11 and the cover 14 to join them together.

The facing surfaces 16, 18 of the cover 14 and the transparent substrate 11 were treated with a plasma of forming gas comprising 5% of hydrogen and 95% of nitrogen, in an Europlasma apparatus.

The (meth)acrylate/epoxy adhesive composition was applied according to the process of the present invention. According to the specific embodiment, (meth)acrylate/epoxy adhesive composition was applied by spraying method onto the cover 14. A layer 15 of (meth)acrylate/epoxy adhesive composition was formed on the surface 16 of the cover 14. The layer 15 was about 10 µm thick. Alternatively, another layer of (meth)acrylate/epoxy adhesive composition can be formed on the surface 18 of the transparent substrate 11.

The (meth)acrylate/epoxy adhesive composition was pre-cured by exposure to an UV-radiation of from about 320 nm to about 400 nm emitted from a lamp having a power of 17 mW/cm$^2$ for about 3 seconds (corresponding to an energy of about 51 mJ/cm$^2$). The irradiation was made under nitrogen atmosphere. The irradiation caused the curing of about 85 mole % of the curable functional groups contained in the (meth)acrylate portion and about 43 mole % of the curable functional groups contained in the epoxy portion of the (M)AE adhesive composition. The resulting pre-cured layer 15 was semi-solid and perfectly planar.

The surface 16 of the cover 14 (bearing the pre-cured layer 15) was contacted with the surface 18 of the transparent substrate 11 (optionally bearing another pre-cured layer, not shown) and subjected to a thermocompression treatment for 15 minutes at a temperature of 80° C. and a pressure of 6 bar. When employing inorganic materials for the cover 14 and substrate 11, the temperature can be raised up to 250° C. The thermocompression treatment was conducted by using apparatus provided with centering means able to line up the cover 14 with the substrate 11.

The thermocompression treatment allows to overcome any bending phenomena of the cover 14 and/or the substrate 11. As the layer 15 has a semi-solid consistency, no straining was observed at the end of the treatment, and the microchannels 12 and chamber 13 were free of any adhesive composition residual.

After the thermocompression treatment, the (meth)acrylate/epoxy adhesive composition was finally cured by exposure to an UV-radiation of from about 260 nm to about 400 nm emitted from a lamp having a power of 100 mW/cm$^2$ for about 15 seconds (corresponding to an energy of about 1500 mJ/cm$^2$).

The present invention will be further illustrated below by means of a number of preparation and evaluation examples of adhesive composition, which are given for purely indicative purposes and without any limitation of this invention.

EXAMPLES

A set of (meth)acrylate/epoxy adhesive composition has been prepared by using the ingredients and the amount (expressed in weight % with respect to the total composition) of the following Table 1.

TABLE 1

|  | L22 | L24 | L25 | L26 |
|---|---|---|---|---|
| Celvenus B1077 | 50 | — | — | — |
| EEC | — | 50.2 | 42.3 | 42.3 |
| TMPEOTA | 20 | 20 | 20 | 20 |
| HBA | — | — | 15 | — |
| Oxetane | 10.1 | 10.1 | 12 | 12 |
| LFC2178 | 2.5 | 2.5 | 2.5 | 2.5 |
| Esacure One 75 | 3 | 3 | 3 | 3 |
| BYK 310 | 0.2 | 0.2 | 0.2 | 0.2 |
| TEGOWET 2200 | 0.2 | — | — | — |
| PEG 300 | 7 | 7 | — | 15 |
| SILQUEST A187 | 7 | 7 | 5 | 5 |

Celvenus B1077 3,4-Epoxycyclohexylmethyl-(3,4-epoxy)cyclohexane carboxylate, Daicel Chemical Industries
EEC Epoxycyclohexylmethyl-Epoxycyclohexane Carboxylate
TMPEOTA Ethoxylated trimethylolpropane triacrylate, Aldrich
HBA Hydroxybutyl acrylate
LFC2178 Triarylsulfonium hexafluoroantimonate, Aldrich
Esacure ONE Difunctional alpha-hydroxyketone photoinitiator, Lamberti S.p.A.
BYK 310 Polyester modified dimethyl polysiloxane, Byk Chemie
TEGOWET 2200 Polysiloxane-polyester copolymer surfactant, Goldschmidt
PEG 300 Polyethylene glycol with average PM = 300,
SILQUEST A187 γ-Glycidoxypropyltrimethoxy silane, GE Silicones Adhesion Test The above described adhesive compositions were tested for evaluating their adhesion strength on different materials.

Each adhesive composition was employed to adhere the sample materials identified in the following Table 2. The samples were prepared by spraying the surface to be joined with adhesive composition. After contacting the surfaces to be joined, the adhesive composition was cured by exposure to UV-radiation by using a D lamp emitting from 200 to 450 nm produced by Fusion UV Systems GmbH. The radiated energy was about 800 mJ/cm$^2$.

The evaluation was made by measuring the breaking load or by detaching the sample materials by knife and visually observing the kind of detachment.

Knife Test

This simple test requires the use of a utility knife to separate two substrates adhered with a cured layer of adhesive composition. The test is able to establish whether the adhesion is at a generally adequate level. Performance is based on both the degree of difficulty to detach the substrates and the observation of the kind of detachment. The knife is forced between the two adhered surfaces and then the knife is used to produce a force perpendicular to the adhered surfaces, until to reach a complete detachment or a rupture of the sample. The detached surfaces are then observed to the optical microscope to evaluate their appearance.

Breaking Load Test

This test was performed by measuring with an Instron instrument the load needed to detach a first square sample of 25 cm$^2$ adhered to a second square sample of about 54 cm$^2$. The samples were made of the same or different material as indicated in Table 2. In correspondence of the centre of the first sample, the second sample had a hole through which the load force is applied to the first sample until to provoke the detachment or the rupture. The measure of the load force was made by using an Instron instrument. The breaking load reported in Table 2 refers to the value obtained for detaching the sample of 25 cm$^2$.

TABLE 2

|  | PMMA/PMMA Breaking load (Kg) | COC/ COC | PMMA/ GLASS | SAN/ GLASS | SILICON/ GLASS |
|---|---|---|---|---|---|
|  |  |  | Knife detachment |  |  |
| L22 | 15 | X | X | X | X |
| L24 | 17 | X | X | X | X |
| L25 | 17 | X | X | X | X |
| L26 | 18 | X | X | X | X |

X = rupture of the sample

All samples subjected to knife test were broken before detachment. This means that the adhesive force was strong, and in particular, that it was stronger than the cohesive forces of the same adhesive material.

Storage Test in Air at Low Temperature

Two sets of sample biochips 1 to 6 according to FIGS. 1 and 2 were realized employing the material for the substrate 11 and the cover 14 as indicated in the following Table 3. The substrate 11 and the cover 14 were joined by using the (meth)acrylate/epoxy adhesive compositions of Table 1 and the process of the present invention, as described in the detailed description above. One set of sample biochips was stored for seven weeks at a temperature of about −10° C., the other set at a temperature of about 40° C. After storage, both sets of sample biochips 1 to 6 were immersed in an aqueous solution of iophenoxic acid and rhodamine to check the presence of detachment areas. All samples passed the test without showing any detachment area.

TABLE 2

| Sample biochip | Substrate | Cover |
|---|---|---|
| 1 | PMMA | PMMA |
| 2 | COC | COC |
| 3 | PC | PC |
| 4 | SILICON | GLASS |
| 5 | SILICON | SILICON |
| 6 | GLASS | GLASS |

Storage Test in Water at Room Temperature

A set of square sample of 25 cm$^2$ of different material (PMMA, COC, PC, glass, and silicon) were sprayed with the above described adhesive compositions and cured under the same conditions described above. The samples were immersed in water at room temperature and stored for one week and three weeks. After storage, the chemical resistance and the adhesion of the cured adhesive composition layer was evaluated by visual inspection with an optical microscope of detachment areas.

All tested adhesive compositions exhibited a good adhesion with the tested materials. All tested adhesive compositions exhibited a good chemical resistance to aqueous solution without any swelling or detachment area.

The invention claimed is:

1. An adhesive composition for assembling a biomedical device comprising at least two components, the adhesive composition in an uncured state comprises:
    an epoxy composition comprising at least one di-functional epoxy monomer;
    an acrylate composition comprising at least one multi-functional acrylate monomer selected from the group consisting of (i) tri-(meth)acrylates, (ii) tetra-(meth)acrylates, and mixtures thereof;
    at least one cationic photoinitiator capable of initiating curing of the epoxy composition;
    at least one free radical photoinitiator capable of initiating curing of the acrylate composition;
    at least one reactive diluent capable of copolymerizing with the epoxy composition; and
    at least one adhesion promoter.

2. The adhesive composition of claim 1, wherein the at least one di-functional epoxy monomer comprises a cycloalkyl epoxy resin, a glycidyl ether of a polyphenol epoxy resin, a glycidyl ester epoxy resin, or a mixture of one or more thereof.

3. The adhesive composition of claim 2, wherein the at least one di-functional epoxy monomer comprises a 3,4-epoxycyclohexylmethyl-(3,4-epoxy)cyclohexane carboxylate and/or a 2,4-epoxycyclohexylmethyl-(3,4-epoxy)cyclohexane carboxylate.

4. The adhesive composition of claim 1, wherein the epoxy composition comprises from about 30% to about 80% by weight based on total weight of the adhesive composition.

5. The adhesive composition of claim 1, wherein the epoxy composition comprises from about 40% to about 70% by weight based on total weight of the adhesive composition.

6. The adhesive composition of claim 1, wherein the at least one multi-functional acrylate monomer comprises an ethoxylated trimethylolpropane triacrylate.

7. The adhesive composition of claim 1, wherein the acrylate composition comprises from about 5% to about 45% by weight based on total weight of the adhesive composition.

8. The adhesive composition of claim 1, wherein the acrylate composition comprises from about 10% to about 30% by weight based on total weight of the adhesive composition.

9. The adhesive composition of claim 1, wherein the at least one cationic photoinitiator comprises triarylsulfonium hexafluoroantimonate.

10. The adhesive composition of claim 1, wherein the at least one free radical photoinitiator comprises a di-functional alpha-hydroxyketone.

11. The adhesive composition of claim 1, wherein the at least one reactive diluent comprises oxetane.

12. The adhesive composition of claim 1, wherein the acrylate composition further comprises at least one mono-functional (meth)acrylate monomer.

13. The adhesive composition of claim 12, wherein the at least one mono-functional (meth)acrylate monomer comprises hydroxybutyl acrylate.

14. The adhesive composition of claim 1 further comprising at least one polyhydric alcohol.

15. The adhesive composition of claim 14, wherein the at least one polyhydric alcohol comprises PEG 300.

16. The adhesive composition of claim 1, wherein the at least one adhesion promoter comprises γ-glycidoxypropyltrimethoxy silane.

17. The adhesive composition of claim 1, further comprising at least one flow agent, at least one surfactant, or both.

18. The adhesive composition of claim 17, comprising a polyester modified dimethyl polysiloxane and/or a polysiloxane-polyester copolymer.

19. The adhesive composition of claim 1, which is in a cured state.

20. The adhesive composition of claim 19, wherein the cured state is obtained by a process that includes activating the at least one cationic photoinitiator, and activating the at least one free radical photoinitiator.

21. A biomedical device for the distribution or containment of biological substances comprising at least two components assembled to each other with an adhesive composition according to claim 1.

22. A method for assembling a biomedical device comprising at least two components, the process comprising:
    forming a film of the uncured adhesive composition of claim 1 on at least one surface of the at least two components;
    pre-curing the adhesive composition film by activating the free radical photoinitiator without substantially activating the cationic photoinitiator;
    contacting the at least two components so that the pre-cured adhesive composition film is interposed between the at least two components; and
    substantially curing the pre-cured adhesive composition film.

23. The method of claim 22, wherein less than 50 mole % of curable functional groups in the epoxy composition is cured when a 20 mm thick layer of said epoxy adhesive composition is exposed with an UV radiation providing an energy higher than 20 mJ/cm2 and lower than 80 mJ/cm2.

24. A method for assembling a biomedical device comprising at least two components, the process comprising:
    forming a film of the uncured adhesive composition of claim 1 on at least one surface of the at least two components;
    pre-curing the adhesive composition film by activating curing of the acrylate composition without substantially activating curing of the epoxy composition;
    contacting the at least two components so that the pre-cured adhesive composition film is interposed between the at least two components; and
    substantially curing the pre-cured adhesive composition film.

25. The method of claim 24, wherein less than 50 mole % of curable functional groups in the epoxy composition is cured when a 20 mm thick layer of said epoxy adhesive composition is exposed with an UV radiation providing an energy higher than 20 mJ/cm2 and lower than 80 mJ/cm2.

* * * * *